United States Patent [19]

Furuoka et al.

[11] Patent Number: 5,185,207
[45] Date of Patent: Feb. 9, 1993

[54] PHOSPHOR FOR CATHODE RAY TUBE AND SURFACE TREATMENT METHOD FOR THE PHOSPHOR

[75] Inventors: Misa Furuoka; Shoichi Bando; Akio Fujii, all of Anan, Japan

[73] Assignee: Nichia Kagaku Kogyo K.K., Tokushima, Japan

[21] Appl. No.: 813,668

[22] Filed: Dec. 27, 1991

[30] Foreign Application Priority Data

Aug. 12, 1990 [JP] Japan .................................. 2-212944
Mar. 6, 1991 [JP] Japan .................................. 3-67942

[51] Int. Cl.⁵ ................................................ B32B 5/16
[52] U.S. Cl. ................................ 428/404; 252/301.6 S; 428/690; 313/467; 313/468; 313/486
[58] Field of Search ................ 428/404, 690; 313/467, 313/468, 486; 252/301.6 S

[56] References Cited

U.S. PATENT DOCUMENTS

| | | | |
|---|---|---|---|
| 3,522,071 | 7/1970 | Yokota et al. | 252/301.6 S |
| 3,690,929 | 9/1972 | Yokota et al. | 252/301.6 S |
| 4,209,567 | 6/1980 | Takahara et al. | 428/403 |
| 4,287,229 | 9/1981 | Watanabe et al. | 428/404 |
| 4,544,605 | 10/1985 | Miyazaki et al. | 428/404 |
| 4,690,832 | 9/1987 | Yale | 428/404 |
| 4,691,140 | 9/1987 | Sakakibara et al. | 313/486 |

FOREIGN PATENT DOCUMENTS

| | | | |
|---|---|---|---|
| 2744763 | 4/1978 | Fed. Rep. of Germany | 313/467 |
| 6709266 | 1/1968 | Netherlands | 313/467 |
| 1168074 | 10/1969 | United Kingdom . | |

Primary Examiner—P. C. Sluby
Assistant Examiner—Mark A. Forman
Attorney, Agent, or Firm—Nixon & Vanderhye

[57] ABSTRACT

In a phosphor for a cathode-ray tube, a composition containing $SiO_2$ and at least one element selected from the group consisting of indium, zirconium, and antimony is adhered on the surfaces of phosphor particles.

6 Claims, 6 Drawing Sheets

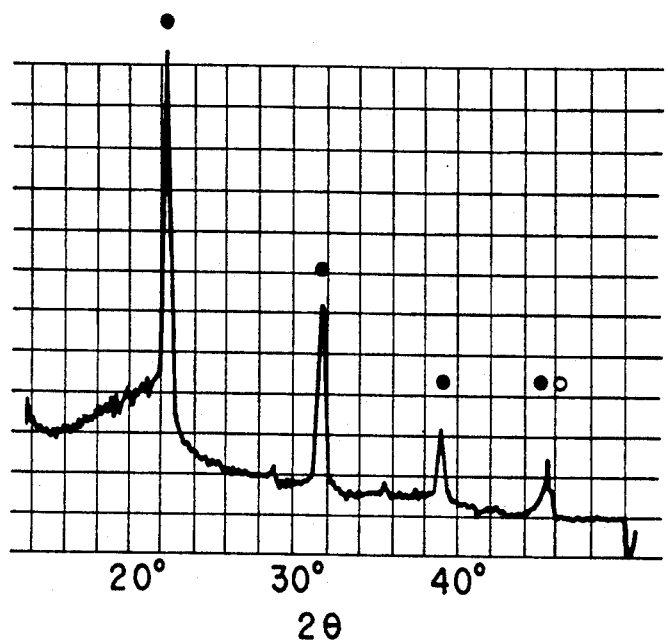
F I G. 1
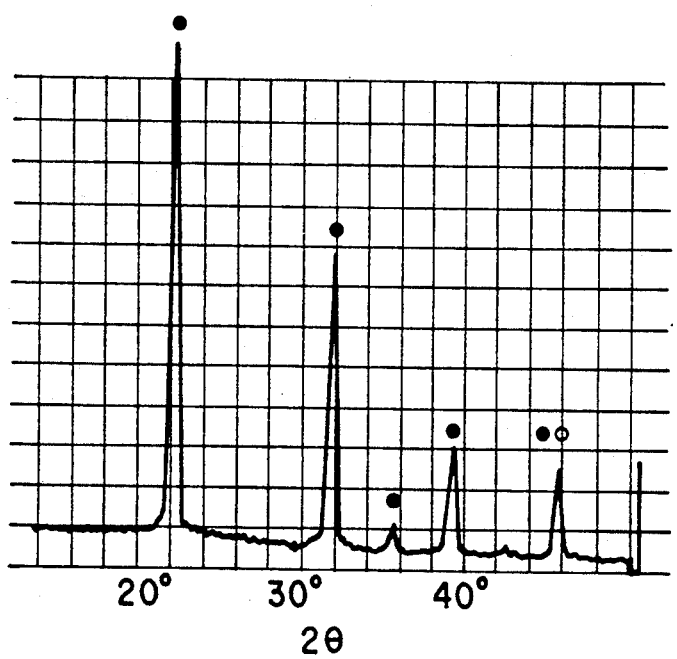
F I G. 2

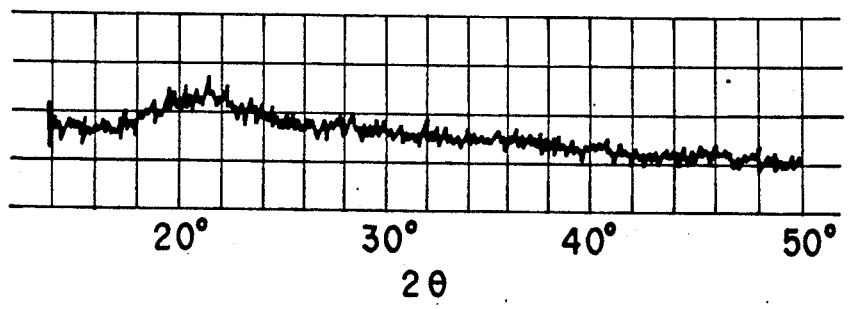
F I G. 11
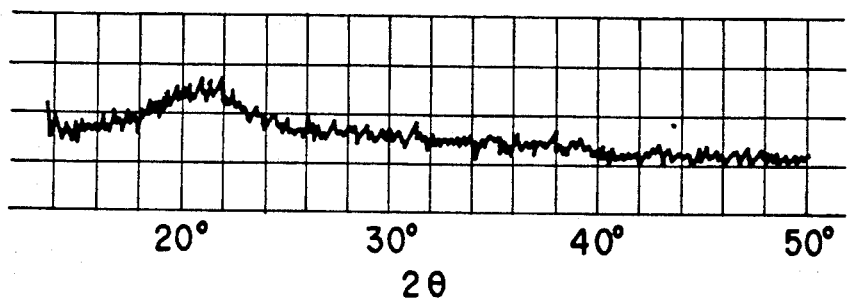
F I G. 12
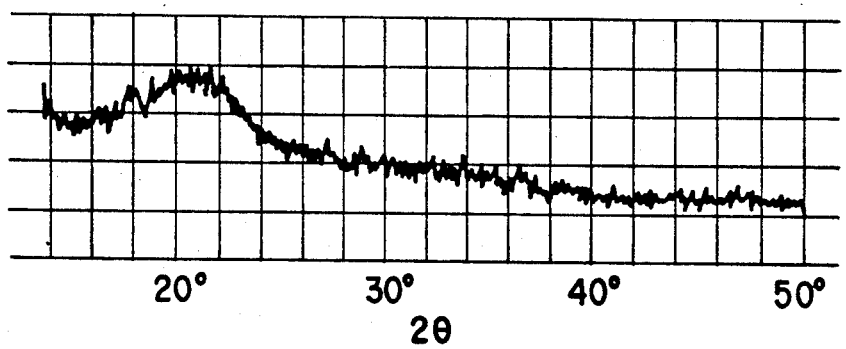
F I G. 13

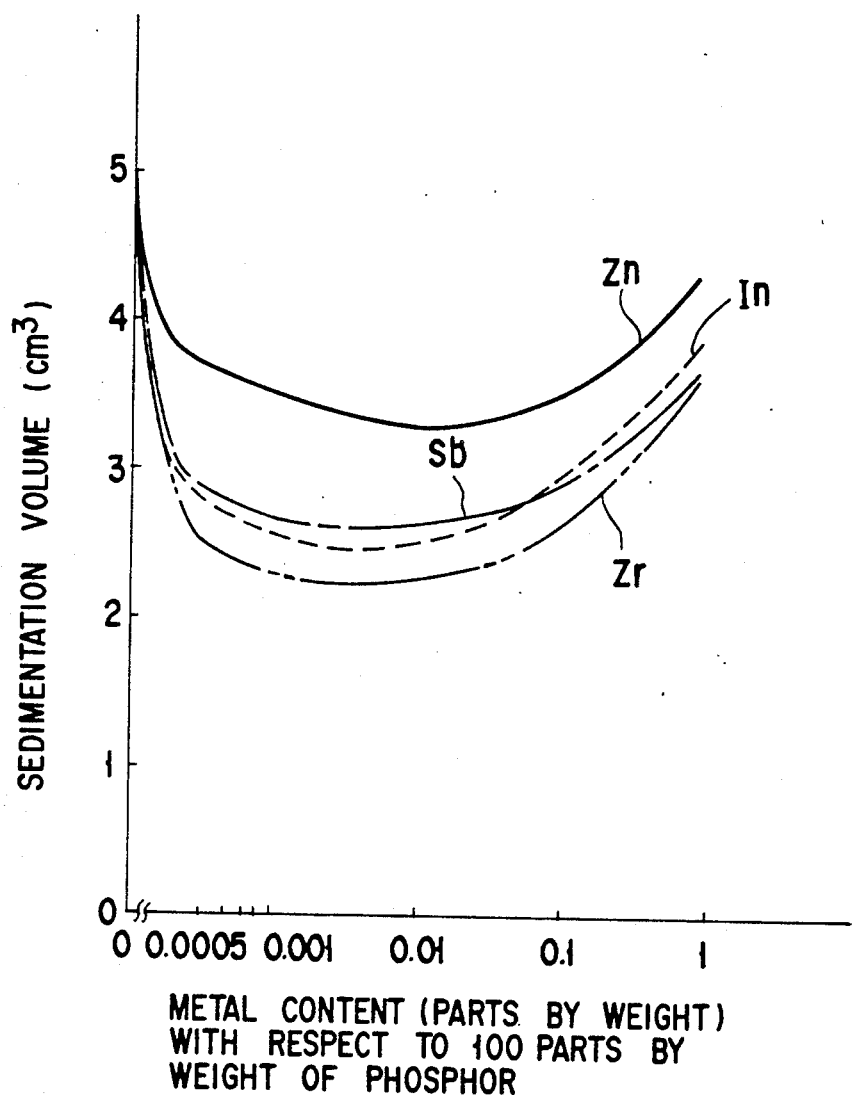
F I G. 14

PHOSPHOR FOR CATHODE RAY TUBE AND SURFACE TREATMENT METHOD FOR THE PHOSPHOR

BACKGROUND OF THE INVENTION

1. Field of the Invention

The present invention relates to a phosphor for a cathode-ray tube, which has good coating characteristics with respect to a cathode-ray tube, and a surface treatment method for the phosphor.

2. Description of the Related Art

In general, a phosphor screen of a color cathode-ray tube is formed by coating a phosphor slurry in the form of dots or stripes on a face plate by photographic printing. This phosphor slurry is prepared by dispersing phosphor particles in a photosensitive resin solution containing ammonium dichromate, PVA (polyvinyl alcohol), and a surfactant.

A phosphor screen thus formed is required to have, primarily, the following coating characteristics:

1. Dense dots or stripes are formed with a uniform thickness.
2. The shape of dots or stripes is precise. That is, all phosphor dots or stripes of respective colors are formed at predetermined positions with a predetermined shape, a predetermined width, and a predetermined size.
3. Dots or stripes do not peel from a face plate.
4. No color mixing is caused between phosphor particles. That is, luminescent components constituted by red, blue, or green phosphor particles coated in the form of dots or stripes do not overlap adjacent luminescent components of different colors; i.e., no color mixing is present.
5. No haze is caused. That is, after dots or stripes constituting luminescent components are formed, no extra portion to be washed away remains on a face plate.

The above coating characteristics are affected by the surface condition of phosphor particles. For this reason, phosphor particles containing various surface treatment substances adhered or attached on their surfaces have been conventionally developed.

One of surface treatment substances to be adhered on phosphor particles and easiest to use is $SiO_2$. A phosphor containing $SiO_2$ as the surface treatment substance is manufactured by adding a silicate compound to a phosphor suspension, and adding an aqueous solution containing, e.g., Zn, Al, Mg, Ba, or Ca to the resultant solution, thereby producing a silicon compound on the surface.

Published Examined Japanese Patent Application No. 50-15747 discloses a method of performing a surface treatment for a phosphor by adding water glass and zinc sulfate to an aqueous suspension of the phosphor.

Published Examined Japanese Patent Application No. 61-46512 discloses a phosphor on which silica, a zinc compound, and an aluminum compound is adhered.

The phosphors described in the above patent applications, however, are still unsatisfactory to satisfy all of the characteristics of items 1 to 5 above.

For example, when zinc silicate is caused to be adhered on phosphor particles, dispersibility of the phosphor in the photosensitive resin solution described above is improved, and consequently the characteristics of items 1, 2, and 3 above are satisfied. However, since phosphor particles are scattered to adjacent dots, the characteristics of items 4 and 5 above cannot be satisfied.

The phosphor which is surface-treated with water glass and zinc sulfate cannot sufficiently satisfy any of the characteristics of items 1 to 5 above.

SUMMARY OF THE INVENTION

The present invention has been made in consideration of the above situation and has as its object to provide a phosphor for a cathode-ray tube, which has excellent coating characteristics and can therefore satisfy all of coating characteristics required for a phosphor, and a method of manufacturing the same.

In order to achieve the above object of the present invention, the present inventors have made extensive studies on a surface treatment substance of a phosphor and a surface treatment method using this surface treatment substance. As a result, the present inventors have found that it is possible to obtain a phosphor for a cathode-ray tube, which can satisfy all of the characteristics described above, by allowing $SiO_2$, and a compound containing indium, zirconium, or antimony to be adhered on the phosphor.

This phosphor is obtained by adding an aqueous solution of silicate or colloidal silica and a solution containing at least one metal selected from the group consisting of indium, zirconium, and antimony to an aqueous suspension containing the phosphor particles, and performing a surface treatment for the phosphor particles by adjusting the pH of the resultant solution.

According to the present invention, $SiO_2$ can be strongly adhered on the surfaces of phosphor particles by the effect of the compound of, e.g., indium, zirconium, or antimony adhered on the phosphor particles. Consequently, there is provided a phosphor for a cathode-ray tube, which can form a good phosphor screen excellent in adhesion strength as well as dispersibility and almost free from haze.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 13 are X-ray diffraction patterns of various types of phosphor surface treatment substances used in the present invention; and FIG. 14 is a graph showing the sedimentation volume as a function of the metal content in a phosphor.

DETAILED DESCRIPTION OF THE PREFERRED EMBODIMENTS

Figure 3:
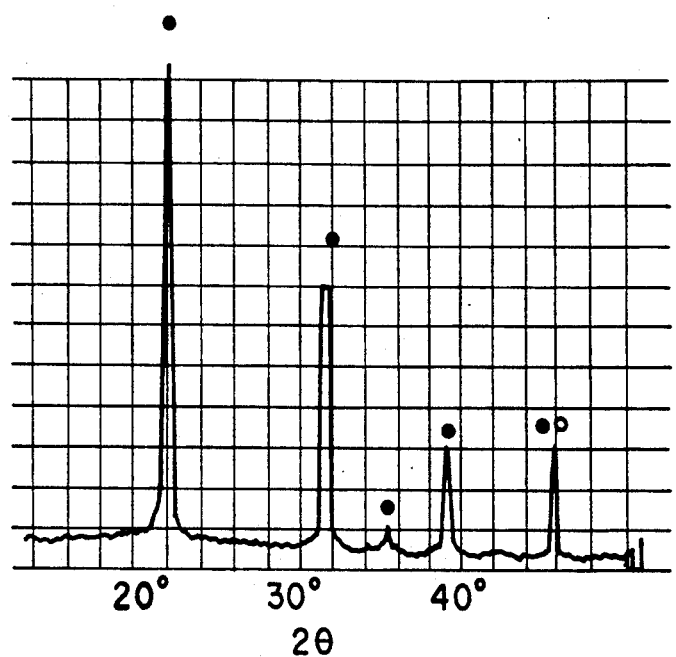

In a phosphor according to the present invention, a composition containing $SiO_2$ and at least one element selected from the group consisting of indium, zirconium, and antimony is adhered on the surface of each phosphor particle.

The phosphor of the present invention is obtained by performing a surface treatment for the phosphor particles in accordance with the following steps:

1. An aqueous suspension containing the phosphor particles is added with an aqueous solution of silicate or colloidal silica and a solution containing at least one metal selected from the group consisting of indium, zirconium, and antimony.

2. An alkali or an acid is added to the resultant suspension to adjust the pH of the suspension to 4 to 10, thus allowing a surface treatment substance containing the added silica and metal to be adhered on phosphor particles.

3. Thereafter, the phosphor is washed with water, separated, and dried.

In the present invention, the phosphor suspension can be added with a solution containing zinc and/or aluminum in addition to the aqueous solution of silicate solution or colloidal silica and the solution containing at least one metal selected from the group consisting of indium, zirconium, and antimony.

The compound adhered on the surface of each phosphor particle of the present invention will be described below.

It has been conventionally known that a silica sol flocculates when the pH of a solution containing the silica sol is adjusted by adding an electrolyte, such as zinc sulfate or aluminum sulfate, to the solution. It is explained that this reaction is the result of the following three reaction stages (i), (ii), and (iii) in the case of, e.g., aluminum. (A Treatise in Inorganic Chemistry Si, page 295, Maruzen.)

(i) Production of a flocculant by hydrolysis of aluminum and polymerization.

(ii) Destabilization of a sol caused by singular adsorption of isopoly cations which reduce the surface potential of colloidal particles.

(iii) Collisions between the colloidal particles moved by Brownian motion or a velocity gradient.

Similarly, in the present invention, when, in the case of, e.g., indium, an aqueous solution containing colloidal silica and indium is added to a phosphor slurry to perform pH adjustment, $In(OH)_3$ forms and the colloidal silica flocculates and adheres on the surface of each phosphor particle. In this state, the compound adhering on the surface of each phosphor particle is $SiO_2 \cdot nH_2O$ ($n \geq 0$) and $In(OH)_3$, or a coprecipitation product of silica and indium. It is assumed that when the phosphor is separated and dried, a mixed crystal of $SiO_2$ and $In(OH)_3$, $SiO_2$ and $In_2O_3 \cdot nH_2O$ ($n \geq 0$), or silica and indium hydrate adheres on the phosphor surface.

A surface treatment substance adhered on a phosphor cannot be specified by a surface analyzer, such as an X-ray diffractometer, while the substance is adhered on the surface of the phosphor. Therefore, a blank test was performed as follows.

An aqueous indium chloride solution was added to a solution containing colloidal silica, and a precipitate produced by adjusting the pH to 7.5 by ammonia water was washed with water and separated. Thereafter, samples of the resultant precipitate were dried at 100° C. for three hours, 100° C. for 12 hours, 150° C. for three hours, and 200° C. for three hours, and the crystal states of the respective dried precipitate samples were measured by X-ray diffractometry. FIGS. 1 to 4 show the obtained X-ray diffraction patterns. Note that in these drawings, the peak of $In(OH)_3$ is represented by ●, and that of $In_2O_3$ is represented by o.

Figure 4:
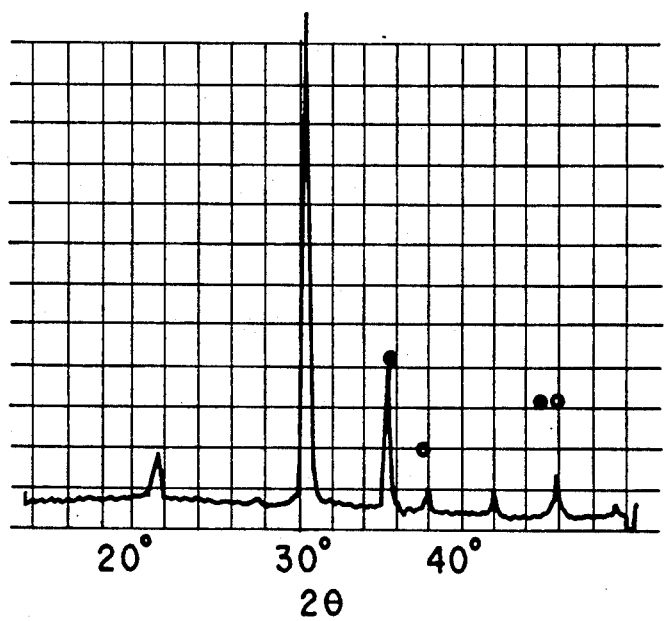

As shown in FIGS. 1 to 4, when the precipitate samples were dried under the respective conditions, the peak of $In(OH)_3$ was detected in all of the samples. In a sample dried at the drying temperature of 200° C., as shown in FIG. 4, peaks which cannot be specified appeared in addition to the peaks of $In_2O_3$ and $In(OH)_3$.

Figure 5:
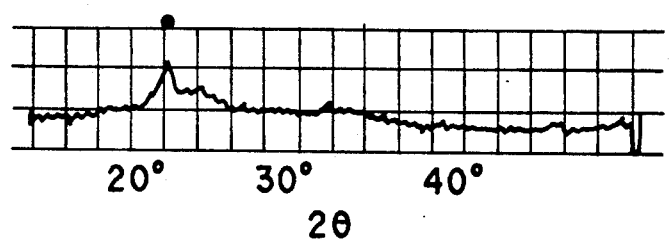
Figure 6:
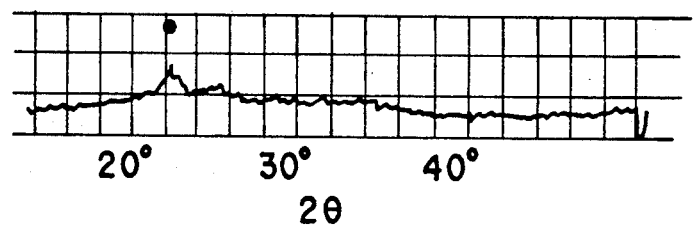
Figure 7:
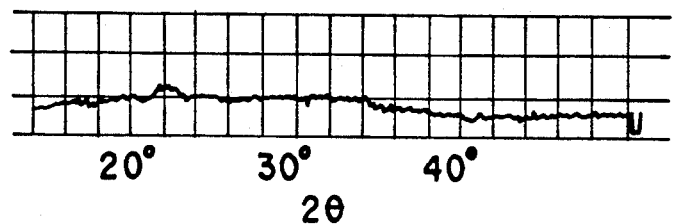

As another blank test, an aqueous indium sulfate solution was added to a solution containing colloidal silica, and pH adjustment was similarly performed to obtain a precipitate. Samples of the precipitate were dried at 100° C., 150° C., and 200° C. for three hours, and the crystal states of the respective resultant precipitate samples were similarly measured. FIGS. 5 to 7 show the obtained X-ray diffraction patterns. Note that in FIGS. 5 to 7, the peak of $In(OH)_3$ is indicated by ● as in FIG. 1. When indium sulfate was used in place of indium chloride, the produced compound became close to amorphous, and this made it difficult to perform peak detection. However, as shown in FIGS. 5 and 6, peaks probably indicating indium hydroxide could be detected in samples dried at the drying temperatures of 100° C. and 150° C.

Figure 8:
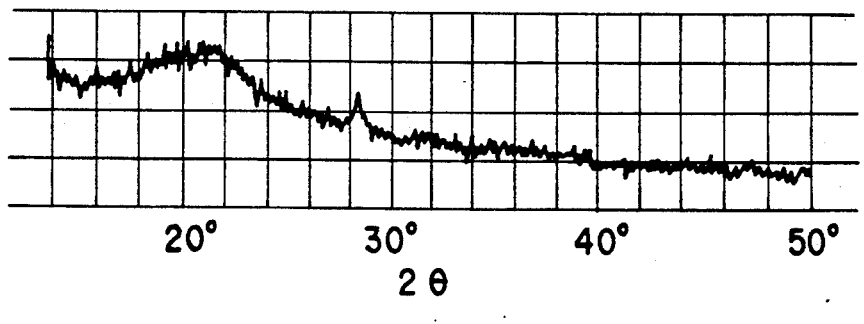
Figure 9:
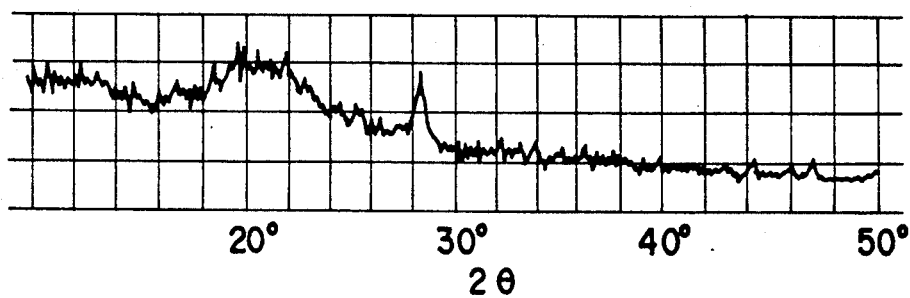
Figure 10:
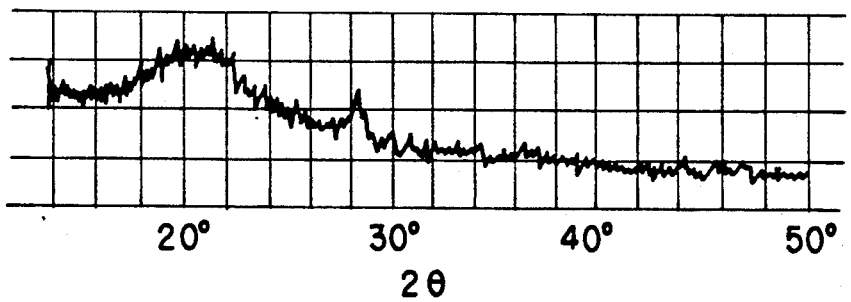

As still another blank test, an aqueous antimony chloride ($SbCl_3$) solution was added to a solution containing colloidal silica. The pH was adjusted to 7.5 by ammonia water, and the produced precipitate was washed with water and separated. Thereafter, samples of the resultant precipitate were dried at 100° C., 150° C., and 200° C. for three hours each. The crystal states of the respective resultant precipitate samples were similarly measured. FIGS. 8 to 10 show X-ray diffraction patterns.

It is assumed that antimony(III) chloride hydrolyzes in an aqueous solution to partially become SbOCl. However, when this substance was used as a flocculant of colloidal silica, no SbOCl was detected but peaks probably indicating $Sb_4O_5Cl_2$ or $Sb_2O_3$ were detected in these X-ray diffraction patterns.

As still another blank test, an aqueous zirconium chloride ($ZrCl_4$) solution was added to a solution containing colloidal silica. The pH was adjusted to 7.5 by ammonia water, and the produced precipitate was washed with water and separated. Thereafter, samples of the resultant precipitate were dried at 100° C., 150° C., and 200° C. for three hours each, and the crystal states of the respective resultant precipitate samples were measured by X-ray diffractometry. FIGS. 11 to 13 show the obtained X-ray diffraction patterns.

As is apparent from FIGS. 11 to 13, no peak of $ZrO_2$ was detected, i.e., each precipitate was amorphous. It is impossible to specify the type of compound formed from zirconium added.

That is, as shown in FIGS. 1 to 13, although weak peaks appear in some of the X-ray diffraction patterns of the precipitates produced from colloidal silica and metal ions, it is assumed that most of the metal ions added form a hydrate or a basic salt. Also, since silica is amorphous, it is not possible to clearly specify the types of compounds forming the individual precipitates.

As described above, a substance adhered on the surface of each particle of the phosphor according to the present invention can be obtained by adding an aqueous solution of silicate or colloidal silica and a solution containing at least one metal selected from the group consisting of indium, zirconium, and antimony to a suspension of the phosphor, and adjusting the pH of the resultant metal suspension. A compound containing the metal and $SiO_2$ is adhered on the surface of this phosphor.

The phosphor used in the present invention is commonly known as a phosphor for a cathode-ray tube. Examples of the phosphor are a zinc sulfide-based phosphor, a zinc phosphate-based phosphor, a zinc silicate-based phosphor, a yttrium trisulfide-based phosphor, a yttrium oxide-based phosphor, and an indium borate based phosphor.

As the aqueous silicate solution to be added to the phosphor suspension, an aqueous solution of, e.g., sodium silicate or potassium silicate can be used. A solution of colloidal silica can also be used.

Examples of the solution containing indium are aqueous solutions of indium sulfate, indium chloride, and indium nitrate.

As the solution containing antimony, an aqueous solution of, e.g., antimony chloride or antimony sulfate can be used. In this case, it is possible to use either trivalent or pentavalent antimony.

Examples of the solution containing zirconium are aqueous solutions of zirconium chloride, zirconium sulfate, and zirconium acetate. In this case, either trivalent or tetravalent zirconium can be used.

In the present invention, it is also possible to use a conventional method of allowing adhesion of $SiO_2$ by using an aqueous solution containing, e.g., zinc or aluminum. In this case, an aqueous solution of, e.g., a sulfate, a chloride, or nitrate of zinc or ammonium can be used as in the case of indium.

The pH of the phosphor suspension is adjusted to fall within the range of 4 to 10 by adding a solution containing indium, zirconium, or antimony, so that $SiO_2$ is adhered on the surface of each phosphor particle. If the pH is less than 4, a precipitate is not formed and $SiO_2$ and metal is not adhered on the surface of each phospher particle. If the pH exceeds, $SiO_2$ is dispersed and is hard to adhere on the surface of each phosphor particle. As the pH of the photosensitive resin solution is increased, a good screen property is not obtained. As the alkali to be added to perform the pH adjustment, NaOH, KOH, or $NH_4OH$ can be used. Examples of the acid for this purpose are $CH_3COOH$, HCl, $NHO_3$, and $H_2SO_4$.

The amount of the aqueous solution containing silicate or that of the colloidal silica to be added to the phosphor suspension is adjusted to fall within the range of, as an amount of $SiO_2$ contained therein, 0.01 to 3 parts by weight, and preferably 0.05 to 1.0 parts by weight with respect to 100 parts by weight of the phosphor.

The amount of indium, zirconium, or antimony to be added to the phosphor suspension is adjusted to fall within the range of, as an amount of the metal contained in an aqueous solution, 0.0005 to 1.0 parts by weight, and preferably 0.01 to 0.5 parts by weight with respect to 100 parts by weight of the phosphor.

When an aqueous solution containing zinc and/or aluminum is to be added to the phosphor suspension, the amount of each metal is adjusted to fall within the range of, as an amount of the metal contained in the aqueous solution, 0 to 0.1 parts by weight, and preferably 0.001 to 0.05 parts by weight.

The amounts of the individual components are adjusted as described above for the reason to be explained below. That is, if the amount of $SiO_2$ is 3 parts by weight or more, the amount of indium or the like is 1 part by weight or more, or the amount of each of zinc and aluminum is 0.1 part by weight or more or their total amount is 0.1 part by weight or more, the dispersibility of the resultant phosphor in a photosensitive resin solution is deteriorated. This dispersibility of the phosphor in a photosensitive resin solution is an important characteristic when the phosphor is applied to, e.g., a phosphor screen of a cathode-ray tube. If the dispersibility is poor, no good phosphor screen can be obtained.

In the surface treatment method of the present invention, the optimum addition amounts of $SiO_2$, indium or the like, zinc and aluminum to be added to the phosphor suspension are as follows. That is, the optimum addition amount of $SiO_2$ is 0.08 to 0.8 parts by weight with respect to 100 parts by weight of the phosphor. The optimum addition amount of indium, zirconium, or antimony is 0.03 to 0.5 parts by weight with respect to 100 parts by weight of the phosphor. The optimum addition amount of each of zinc and aluminum is 0.01 to 0.05 parts by weight with respect to 100 parts by weight of the phosphor.

In the present invention, the drying temperature of the phosphor on which the surface treatment substance is adhered is preferably adjusted to 80° C. to 200° C. This is so because if the phosphor is dried or baked at a temperature of 200° C. or more, the dispersibility of the phosphor tends to deteriorate.

FIG. 14 is a graph showing the dispersibility of an example of the phosphor of the present invention and that of a comparative example. To obtain this example of the phosphor, 0.1 part by weight of colloidal silica is added to a phosphor suspension containing 100 parts by weight of a ZnS : Ag,Al phosphor, and different amounts of an aqueous indium sulfate solution are independently added to the resultant suspension to adjust the pHs of the respective resultant solutions to 7.5. Thereafter, each of the resultant precipitates was separated by washing with water and dried at 150° C. for three hours. Other examples of the phosphor of the present invention can be obtained by using antimony sulfate and zirconium sulfate in place of indium sulfate.

The comparative example of the phosphor of the present invention is obtained in the following manner. That is, 0.1 part by weight of colloidal silica is added to a phosphor suspension containing a surface-treated phosphor and 100 parts by weight of a ZnS : Ag,Al phosphor, and different addition amounts of an aqueous zinc sulfate solution were independently added to the resultant suspension to adjust the pHs of the respective resultant solutions to 7.4. Thereafter, each of the precipitates was separated by washing with water and dried at 150° C. for three hours.

The graph of FIG. 14 shows the dispersibility of each phosphor in terms of a sedimentation volume obtained by dispersing 7.5 g of the phosphor on which one of the respective surface treatment substances is adhered into 15 ml of a solution which contains ammonium dichromate, PVA, and a surfactant, placing the resultant solution in a centrifugal sedimentation tube, and performing a centrifugal separation at 1,000 rpm for 15 minutes. A phosphor with a good dispersibility has a low sedimentation rate and therefore has a small sedimentation volume.

As is apparent from FIG. 14, each phosphor on which the surface treatment substance containing indium is adhered has a small sedimentation volume and hence has an improved dispersibility as compared with the conventional phosphors on which the conventional surface treatment substance containing zinc is adhered.

Table 1 shows a comparison between the peeling rates of $SiO_2$ caused to be adhered on the surfaces of the phosphors of the present invention and the conventional phosphor. The peeling rate of $SiO_2$ was measured as follows.

That is, a predetermined amount of a phosphor was mixed in a coating solution which was commonly used in a phosphor screen coating step of a cathode-ray tube and contained, e.g., a dichromate, thus preparing a coating slurry. Four types of phosphors each obtained by causing 0.3 wt % of $SiO_2$ and 0.05 wt % of one of In, Sb, Zr, and Zn to be adhered on a ZnS : Cu,Au phosphor were used as the above phosphor. The resultant coating slurry was refluxed for a predetermined time period by a pump used in an actual phosphor screen coating step of a cathode-ray tube. Thereafter, the resultant phosphor was separated, washed with water three times, and dried. The $SiO_2$ adhesion amount of the obtained phosphor was analyzed. The amount of removed $SiO_2$ was calculated by subtracting this $SiO_2$ adhesion amount from the initial $SiO_2$ adhesion amount.

TABLE 1

| $SiO_2$ | Phosphor of present invention | | | Conventional phosphor |
|---|---|---|---|---|
| | In | Sb | Zr | Zn |
| peeling rate (%) | 36.4 | 20.0 | 23.3 | 54.1 |

As described above, according to the present invention, it is possible to allow $SiO_2$ to be strongly adhered on the surface of a phosphor by indium, zirconium, or antimony added to a phosphor suspension. Therefore, since the degree of peeling of $SiO_2$ from the surface of a phosphor is decreased, there is provided a phosphor for a cathode-ray tube, which has an improved dispersibility, hardly causes haze, and has a high adhesion strength.

In addition, a phosphor having good coating characteristics can be obtained even by using conventional zinc or aluminum in addition to the components according to the present invention.

EXAMPLE

EXAMPLES 1-13

In Examples, the phosphor of the present invention was obtained by using steps 1 to 7 below.

1. 200 g of a phosphor for a cathode-ray tube are suspended in 600 ml of ion-exchange water to obtain a phosphor suspension.

2. An aqueous solution containing colloidal silica, granular silica, or silicate was added to the obtained phosphor suspension. The addition amounts of silica, as $SiO_2$ contents, are listed in Tables 2 to 5 below.

3. An aqueous solution containing indium, zirconium, or antimony is added to the resultant phosphor suspension. The metal content and the addition amount of each aqueous metal solution containing In, Sb, or Zr are listed in Tables 2 to 5 below.

4. An alkali or an acid is dropped in the suspension under stirring to adjust the pH. Thereafter, the stirring is stopped to leave the suspension to stand, thereby obtaining a sediment of the phosphor. The type and the pH of an acid or an alkali to be added are also listed in Tables 2 to 5 below.

5. When the phosphor sediments sufficiently, the supernatant liquid is decanted, and water is added again. The resultant solution is stirred and then left to stand to obtain a sediment of the phosphor.

After this operation is repeated three times, the resultant sediment is washed with water and filtered by suction by using a Nutsche funnel in which filter paper is placed, thus separating the phosphor.

6. The phosphor is removed from the Nutsche funnel and dried at 80° C. to 200° C. for two to eight hours.

7. The dried phosphor is screened using a screen with 380 mesh to obtain the phosphor of the present invention. Thereafter, the obtained phosphor is subjected to various examinations.

The materials and conditions in the above examples are listed in Tables 2 to 5 below. In these tables, 1 represents the type of a phosphor for a cathode-ray tube used; 2, the concentration, the type, and the addition amount of an aqueous solution containing silica; 3, the concentration, the type, and the addition amount of an aqueous solution containing, e.g., indium; 4, the type of an alkali or an acid dropped and the pH of a suspension; and 6, the drying temperature and the drying time.

TABLE 2

| | | Example | | | |
|---|---|---|---|---|---|
| | | 1 | 2 | 3 | 4 |
| 1 | Phosphor | ZnS: Cu, Al | ZnS: Cu, Au, Al | ZnS: Ag, Al | $Y_2O_2S$: Eu |
| 2 | Added silica | $SiO_2$ content 20% Colloidal silica 5 g | $SiO_2$ content 20% Colloidal silica 7.5 g | $SiO_2$ content 10% Aqueous $K_2SiO_3$ solution 15 g | $SiO_2$ content 20% Collodial silica 1 g |
| 3 | Aqueous In, Sb, Zr, Zn, or Al solution | $InCl_3$ In content 2% 20 ml | $InCl_3$ In content 2% 25 ml | $In_2(SO_4)_3$ In content 2% 20 ml | $In(NO_3)_3$ In content 2% 5 ml |
| 4 | Alkali or acid pH | 2% $NH_4OH$ 7.5 | 2% $NH_4OH$ 7.5 | 0.1% HCl 6.5 | 2% $NH_4OH$ 8.0 |
| 6 | Drying temperature | 100° C. | 100° C. | 100° C. | 200° C. |
| | Drying time | 3 hr | 3 hr | 8 hr | 2 hr |

TABLE 3

| | | Example | | | |
|---|---|---|---|---|---|
| | | 5 | 6 | 7 | 8 |
| 1 | Phosphor | ZnS: Cu, Au, Al | ZnS: Cu, Al | ZnS: Ag, Cl | ZnS: Cu, Au, Al |
| 2 | Added silica | $SiO_2$ content 20% Colloidal silica 10 g | $SiO_2$ content 20% Colloidal silica 3 g | $SiO_2$ content 20% Colloidal silica 10 g | $SiO_2$ content 20% Collodial silica 15 g |
| 3 | Aqueous Zr, Zn, or Al solution | *2% $In(NO_3)_2$ 5 ml + 1% $Zn(SO_4)_2$ 5 ml | $ZrO(NO_3)_2$ Zr content 2% 10 ml | $ZrCl_4$ Zr content 2% 10 ml | $ZrO(NO_3)_2$ Zr content 2% 60 ml |
| 4 | Alkali or acid pH | 2% $NH_4OH$ 7.5 | 2% $NH_4OH$ 7.5 | 5% NaOH 8.5 | 2% $NH_4OH$ 7.8 |
| 6 | Drying temperature | 150° C. | 100° C. | 150° C. | 100° C. |
| | Drying time | 3 hr | 3 hr | 2 hr | 8 hr |

*2% $In(NO_3)_3$ and 1% $Zn(SO_4)_2$ mean In content 2% and Zn Content 1%, respectively.

TABLE 4

|   |   | Example | | | |
|---|---|---|---|---|---|
|   |   | 9 | 10 | 11 | 12 |
| 1 | Phosphor | $Y_2O_2S$: Eu | ZnS: Cu, Al | ZnS: Ag, Cl | ZnS: Cu, Au, Al |
| 2 | Added silica | $SiO_2$ content 10% Aqueous $K_2SiO_3$ solution 1 g | $SiO_2$ content 20% Colloidal silica 7 g | $SiO_2$ content 20% Colloidal silica 5 g | $SiO_2$ content 20% Colloidal silica 6 g |
| 3 | Aqueous In, Sb, Zr, Zn, or Al solution | $Zr(SO_4)_2$ Zr content 2% 2 ml | $SbCl_3$ Sb content 2% 85 ml | $Sb_2(SO_4)_3$ Sb content 2% 15 ml | $SbCl_3$ Sb content 2% 5 ml |
| 4 | Alkali or acid | 2% $CH_3COOH$ | 2% NaOH | 2% $NH_4OH$ | 5% NaOH |
|   | pH | 4.5 | 7.5 | 8.5 | 6.0 |
| 6 | Drying temperature | 200° C. | 150° C. | 200° C. | 100° C. |
|   | Drying time | 2 hr | 2 hr | 2 hr | 4 hr |

TABLE 5

|   |   | Example 13 |
|---|---|---|
| 1 | Phosphor | $Y_2O_2S$: Eu |
| 2 | Added silica | $SiO_2$ content 20% Colloidal silica 1 g |
| 3 | Aqueous In, Sb, Zr, Zn, or Al solution | $Sb_2(SO_4)_3$ Sb content 2% 50 ml |
| 4 | Alkali or acid pH | 2% $NH_4OH$ 7.5 |
| 6 | Drying temperature Drying time | 100° C. 8 hr |

COMPARATIVE EXAMPLES 1–13

Conditions

Conventional surface-treated phosphors were obtained following the same procedures as in the example of the present invention except that in step 3 of steps 1 to 7, an aqueous solution containing indium, antimony, or zirconium was replaced with an aqueous solution containing zinc or aluminum. The materials and conditions used in this step are listed in Tables 6 to 9 below.

TABLE 6

|   |   | Comparative Example | | | |
|---|---|---|---|---|---|
|   |   | 1 | 2 | 3 | 4 |
| 1 | Phosphor | The same as in Example 1 | The same as in Example 2 | The same as in Example 3 | The same as in Example 4 |
| 2 | Silica | The same as in Example 1 | The same as in Example 2 | The same as in Example 3 | The same as in Example 4 |
| 3 | Aqueous In, Sb, Zr, Zn, or Al solution | $ZnSO_4$ Zn content 2% 20 ml | $ZnSO_4$ Zn content 2% 25 ml | $Al_2(SO_4)_3$ Zn content 2% 20 ml | $ZnCl_2$ Zn content 2% 5 ml |
| 4 | Alkali or acid pH | 2% $NH_4OH$ 7.4 | 2% $NH_4OH$ 7.4 | 2% $NH_4OH$ 7.4 | 2% $NH_4OH$ 8.0 |
| 6 | Drying temperature Drying time | The same as in Example 1 | The same as in Example 2 | The same as in Example 3 | The same as in Example 4 |

TABLE 7

|   |   | Comparative Example | | | |
|---|---|---|---|---|---|
|   |   | 5 | 6 | 7 | 8 |
| 1 | Phosphor | The same as in Example 5 | The same as in Example 6 | The same as in Example 7 | The same as in Example 8 |
| 2 | Silica | The same as in Example 5 | The same as in Example 6 | The same as in Example 7 | The same as in Example 8 |
| 3 | Aqueous In, Sb, Zr, Zn, or Al solution | $ZnSO_4$ Zn content 2% 7.5 ml | $ZnSO_4$ Zn content 2% 10 ml | $ZnSO_4$ Zn content 2% 10 ml | $Al_2(SO_4)_3$ Al content 2% 60 ml |
| 4 | Alkali or acid pH | 2% $NH_4OH$ 7.4 | 2% $NH_4OH$ 7.4 | 2% $NH_4OH$ 7.4 | 2% $NH_4OH$ 7.4 |
| 6 | Drying temperature Drying time | The same as in Example 5 | The same as in Example 6 | The same as in Example 7 | The same as in Example 8 |

TABLE 8

|   |   | Comparative Example | | | |
|---|---|---|---|---|---|
|   |   | 9 | 10 | 11 | 11 |
| 1 | Phosphor | The same as in Example 9 | The same as in Example 10 | The same as in Example 11 | The same as in Example 12 |
| 2 | Silica | The same as in Example 9 | The same as in Example 10 | The same as in Example 11 | The same as in Example 12 |
| 3 | Aqueous In, Sb, Zr, Zn, or Al solution | $Zn(Cl_2)_2$ Zn content 2% 2 ml | $ZnSO_4$ Zn content 2% 85 ml | $ZnSO_4$ Zn content 2% 15 ml | $ZnSO_4$ Zn content 2% 5 ml |
| 4 | Alkali or acid pH | 2% $NH_4OH$ 7.3 | 2% $NH_4OH$ 7.4 | 2% $NH_4OH$ 7.4 | 2% $NH_4OH$ 7.4 |
| 6 | Drying temperature Drying time | The same as in Example 9 | The same as in Example 10 | The same as in Example 11 | The same as in Example 12 |

TABLE 9

|   |   | Comparative Example 13 |
|---|---|---|
| 1 | Phosphor | The same as in Example 13 |
| 2 | Silica | The same as in Example 13 |
| 3 | Aqueous In, Sb, Zr, Zn, or Al solution | $Al_2(SO_4)_3$ Al content 2% 50 ml |
| 4 | Alkali or acid pH | 2% $NH_4OH$ 7.4 |
| 6 | Drying temperature Drying time | The same as in Example 13 |

Comparison in coating characteristics of examples with comparative examples

Each of the phosphors of Examples 1 to 13 and those of corresponding Comparative Examples 1 to 13 was dispersed in a photosensitive resin solution containing ammonium dichromate, PVA, and a surfactant, and the resultant solution was coated on a face plate. Thereafter, each resultant structure was exposed through a stripe-like shadow mask, and its coating characteristics were evaluated.

Comparison of sharpness in coating characteristics

The edges of stripes formed by a phosphor with a good dispersibility are straight parallel lines. However, the edges of stripes formed by a phosphor with poor dispersibility are serrated to form wavy parallel lines. In order to compare sharpness in coating characteristics, the ratio of the length of a wavy line/the straight distance defined by the line is considered. This ratio of a phosphor with a good sharpness is close to 1.

Comparison of adhesion strength of phosphors

A phosphor slurry was coated on a face plate and dried. Thereafter, in exposing the resultant structure through a stripe-like shadow mask, a transmittance-variable filter was placed between an exposure light source and the shadow mask. In this case, the stripe width formed on a phosphor screen upon exposure using a filter with a transmittance of 100% was set to 180 μm, and the filter transmittance was gradually decreased to decrease the exposure amount. As the exposure amount was decreased, the stripe width on the phosphor screen was decreased, and peeling of the stripes finally occurred. The stripe width was evaluated as the adhesion strength of that phosphor. That is, it can be considered that a phosphor whose stripe width at which the peeling starts is small has a high adhesion strength.

Comparison of haze

This characteristic was determined by counting, through microscopic observation, the number of phosphor particles remaining except for stripes per unit phosphor screen area (1 mm$^2$) after exposure and washing, and averaging the counts at three positions. "Excellent", "good", and "unsatisfactory" were determined when the number of phosphor particles was three or less, four or more, and 10 or more, respectively.

The above measurement results are listed in Tables 10 and 11.

TABLE 10

| | Sharp-ness | Adhesion strength (μm) | Haze | Adhesion substance (converted amount) SiO$_2$ (%) | In etc. (%) |
|---|---|---|---|---|---|
| Example 1 | 1.418 | 120 | Good | 0.5 | 0.2 |
| Comparative Example 1 | 1.551 | 130 | Unsatisfactory | 0.5 | 0.2 |
| Example 2 | 1.450 | 125 | Excellent | 0.75 | 0.25 |
| Comparative Example 2 | 1.642 | 134 | Unsatisfactory | 0.75 | 0.25 |
| Example 3 | 1.635 | 115 | Excellent | 0.75 | 0.2 |
| Comparative Example 3 | 1.782 | 130 | Unsatisfactory | 0.75 | 0.2 |
| Example 4 | 1.325 | 124 | Good | 0.1 | 0.05 |
| Comparative Example 4 | 1.400 | 138 | Unsatisfactory | 0.1 | 0.05 |
| Example 5 | 1.245 | 118 | Excellent | 1.0 | 0.075 |
| Comparative Example 5 | 1.428 | 125 | Unsatisfactory | 1.0 | 0.075 |
| Example 6 | 1.372 | 102 | Good | 0.3 | 0.1 |
| Comparative Example 6 | 1.701 | 143 | Unsatisfactory | 0.3 | 0.1 |
| Example 7 | 1.340 | 113 | Excellent | 1.0 | 0.1 |
| Comparative Example 7 | 1.721 | 142 | Unsatisfactory | 1.0 | 0.1 |

TABLE 11

| | Sharp-ness | Adhesion strength (μm) | Haze | Adhesion substance (converted amount) SiO$_2$ (%) | In etc. (%) |
|---|---|---|---|---|---|
| Example 8 | 1.411 | 147 | Good | 1.5 | 0.6 |
| Comparative Example 8 | 1.493 | 156 | Unsatisfactory | 1.5 | 0.6 |
| Example 9 | 1.277 | 143 | Excellent | 0.05 | 0.02 |
| Comparative Example 9 | 1.515 | 170 | Unsatisfactory | 0.05 | 0.02 |
| Example 10 | 1.430 | 132 | Good | 0.7 | 0.85 |
| Comparative Example 10 | 1.653 | 153 | Unsatisfactory | 0.7 | 0.85 |
| Example 11 | 1.332 | 137 | Excellent | 0.5 | 0.15 |
| Comparative Example 11 | 1.523 | 157 | Unsatisfactory | 0.5 | 0.15 |
| Example 12 | 1.345 | 103 | Excellent | 0.6 | 0.05 |
| Comparative Example 12 | 1.535 | 154 | Unsatisfactory | 0.6 | 0.05 |
| Example 13 | 1.345 | 140 | Good | 0.1 | 0.5 |
| Comparative Example 13 | 1.701 | 170 | Unsatisfactory | 0.1 | 0.5 |

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A phosphor for a cathode-ray tube comprising:
   phosphor particles; and
   a surface treatment composition adhered on the surfaces of said phosphor particles containing, per 100 parts by weight of said phosphor, 0.01 to 3 parts by weight of SiO$_2$ and 0.0005 to 1.0 part by weight, per 100 parts by weight of said phosphor, of at least one element selected from the group consisting of indium zirconium, and antimon.

2. A phosphor according to claim 1, wherein the amount of indium, zirconium, or antimony contained in said surface treatment composition is 0.01 to 0.5 parts by weight with respect to 100 parts by weight of said phosphor.

3. A phosphor according to claim 1, wherein said surface treatment composition also contains less than 0.1 part of at least one element selected from the group consisting of zinc and aluminum.

4. A phosphor according to claim 1, wherein said phosphor is at least one member selected from the group consisting of a zinc sulfide-based phosphor, a zinc phosphate-based phosphor, a zinc silicate-based phosphor, a yttrium trisulfide-based phosphor, a yttrium oxide-based phosphor, and an indium borate-based phosphor.

5. A phosphor according to claim 1, wherein said composition contains 0.08 to 0.8 parts by weight of SiO$_2$, 0.03 to 0.5 parts by weight of at least one metal selected from the group consisting of indium, zirconium, and antimony, and 0.01 to 0.05 parts by weight of at least one element selected from the group consisting of zinc and aluminum.

6. A phosphor according to claim 1, wherein at least one metal selected from the group consisting of indium, zirconium, and antimony is present in the form of a compound.

* * * * *